US009415304B2

(12) United States Patent
Harp et al.

(10) Patent No.: US 9,415,304 B2
(45) Date of Patent: Aug. 16, 2016

(54) SYSTEM AND METHOD FOR ENABLING USER COOPERATION IN AN ASYNCHRONOUS VIRTUAL ENVIRONMENT

(75) Inventors: Derek Harp, San Mateo, CA (US); Bengt Gregory-Brown, Springfield, OH (US); Pat Savelli, Dayton, OH (US); James J. Hooker, Beavercreek, OH (US)

(73) Assignee: MASLOW SIX ENTERTAINMENT, INC., San Mateo, CA (US)

( * ) Notice: Subject to any disclaimer, the term of this patent is extended or adjusted under 35 U.S.C. 154(b) by 985 days.

(21) Appl. No.: 13/115,461

(22) Filed: May 25, 2011

(65) Prior Publication Data

US 2011/0302508 A1 Dec. 8, 2011

Related U.S. Application Data

(60) Provisional application No. 61/351,159, filed on Jun. 3, 2010.

(51) Int. Cl.
*A63F 13/12* (2006.01)
*A63F 9/24* (2006.01)
*A63F 13/30* (2014.01)
*A63F 13/40* (2014.01)

(52) U.S. Cl.
CPC .............. *A63F 13/12* (2013.01); *A63F 13/10* (2013.01); *A63F 2300/5533* (2013.01)

(58) Field of Classification Search
CPC ........................................................ G06F 7/06
USPC ....................................................... 705/7.42
See application file for complete search history.

(56) References Cited

U.S. PATENT DOCUMENTS

| 5,697,844 | A | * | 12/1997 | Von Kohorn | H04N 7/0884 348/E7.024 |
| 6,024,643 | A | | 2/2000 | Begis | 463/42 |
| 6,206,782 | B1 | | 3/2001 | Walker et al. | |
| 8,128,498 | B2 | | 3/2012 | Aguilar, Jr. et al. | 463/36 |
| 8,357,045 | B2 | * | 1/2013 | Youm | A63F 13/10 463/4 |
| 8,444,490 | B2 | | 5/2013 | Youm | 463/42 |
| 8,608,537 | B2 | | 12/2013 | Harp et al. | 463/9 |
| 8,944,923 | B2 | | 2/2015 | Harp et al. | 463/42 |
| 2003/0216184 | A1 | | 11/2003 | Kigoshi | 463/42 |
| 2004/0051745 | A1 | * | 3/2004 | Gargi | 345/850 |
| 2006/0121971 | A1 | | 6/2006 | Slomiany et al. | |
| 2006/0154710 | A1 | | 7/2006 | Serafat | 463/1 |
| 2006/0205461 | A1 | | 9/2006 | LaRocca et al. | |
| 2008/0207327 | A1 | * | 8/2008 | Van Luchene | A63F 13/12 463/42 |
| 2009/0006604 | A1 | * | 1/2009 | Dhupelia | A63F 13/12 709/223 |
| 2009/0111583 | A1 | * | 4/2009 | Zalewski | A63F 13/12 463/42 |

(Continued)

OTHER PUBLICATIONS

Bogost (Asynchronous Multiplay Dec. 2004).*

*Primary Examiner* — Hafiz Kassim
(74) *Attorney, Agent, or Firm* — Pillsbury Winthrop Shaw Pittman LLP

(57) ABSTRACT

An asynchronous virtual environment may be provided to users in which synchronous, time-sensitive cooperation between the users is enabled in spite of the asynchronous nature of the virtual environment. Synchronous, time-sensitive cooperation between users may have an impact on gaining and/or retaining users in a virtual environment, such as a videogame or virtual space. For example, such cooperation between users may strengthen a sense of group, community, and/or camaraderie between cooperating users.

16 Claims, 4 Drawing Sheets

(56) References Cited

U.S. PATENT DOCUMENTS

| | | | | |
|---|---|---|---|---|
| 2009/0149248 A1* | 6/2009 | Busey | ..................... | A63F 13/12 463/29 |
| 2009/0163272 A1* | 6/2009 | Baker | ..................... | A63F 13/12 463/29 |
| 2009/0307189 A1* | 12/2009 | Bobbitt et al. | ..................... | 707/3 |
| 2009/0307611 A1* | 12/2009 | Riley | ..................... | A63F 13/12 715/757 |
| 2009/0325712 A1* | 12/2009 | Rance | ..................... | A63F 13/12 463/42 |
| 2010/0030565 A1 | 2/2010 | Holt et al. | | |
| 2010/0160038 A1* | 6/2010 | Youm | ..................... | A63F 13/10 463/29 |
| 2011/0281638 A1* | 11/2011 | Bansi | ..................... | A63F 13/10 463/23 |
| 2012/0021825 A1 | 1/2012 | Harp et al. | ..................... | 463/30 |
| 2012/0071244 A1* | 3/2012 | Gillo et al. | ..................... | 463/42 |
| 2014/0100032 A1 | 4/2014 | Harp et al. | ..................... | 463/31 |

* cited by examiner

SYSTEM AND METHOD FOR ENABLING USER COOPERATION IN AN ASYNCHRONOUS VIRTUAL ENVIRONMENT

RELATED APPLICATION

This application claims priority to U.S. Provisional Patent Application No. 61/351,159, entitled "SYSTEM AND METHOD FOR ENABLING USER COOPERATION IN AN ASYNCHRONOUS VIRTUAL ENVIRONMENT," and filed Jun. 3, 2010, which is hereby incorporated by reference into the present application in its entirety.

FIELD OF THE INVENTION

The invention relates to enabling synchronous cooperation between users in an asynchronous virtual environment, such as an asynchronous videogame or virtual space.

BACKGROUND OF THE INVENTION

A variety of asynchronous virtual environments are known. Such environments are typically hosted, served, or otherwise supported by a server accessible to users over a network (e.g., the Internet). However, asynchronous virtual environments generally do not provide for direct in-environment interactions between users that are provided in synchronous multi-user environments. Instead, individual users are provided with access to separate instances of the asynchronous virtual environment that does not represent interactions of other users with the asynchronous virtual environment.

Due to the asynchronous nature of known asynchronous virtual environments, typically users may not able to cooperate with each other in a synchronous, time-sensitive manner. Instead, any cooperation, competition, or other in-environment interactions between the users may be accommodated on an asynchronous manner (e.g., turn-based, leader board competition, and/or other asynchronous interactions).

SUMMARY

One aspect of the invention relates to a system and method for providing an asynchronous virtual environment to users in which synchronous, time-sensitive cooperation between the users is enabled in spite of the asynchronous nature of the virtual environment. Synchronous, time-sensitive cooperation between users may have an impact on gaining and/or retaining users in a virtual environment, such as a videogame or virtual space. For example, such cooperation between users may strengthen a sense of group, community, and/or camaraderie between cooperating users.

In order to facilitate synchronous, time-sensitive cooperation between users in the asynchronous virtual environment, a group activity may be presented to a user group. The group activity may be defined by a set of activity criteria. The activity criteria may define a common task or set of related tasks. The activity may define a time period or other timing interval within which the task(s) are to be attempted by the users in the user group. The users in the user group may separately and individually attempt to perform the task(s) within their own instance of the asynchronous virtual environment in a concurrent and/or time sensitive manner. Success of the user group as a whole for the group activity may depend on the cumulative successes and/or failures of the individual users with their separate performances. The users in the user group may receive a consequence of their success or failure, as a group, in performing the group activity.

In some implementations, the system may include one or more virtual environment servers configured to execute one or more computer program modules. The one or more computer program modules may include one or more of an environment module, an activity definition module, activity initiation module, a group performance monitoring module, an activity evaluation module, an activity consequence module, and/or other modules.

The environment module may be configured to provide the asynchronous virtual environment to users via client computing platforms used by the users. As used herein, a "virtual environment" may include a virtual space, one or more interactive electronic media, and/or other virtual environments. As used herein, the term "asynchronous virtual environment" may refer to a virtual environment that is provided to a given user individually such that the given user may interact with a separate instance of the virtual environment (e.g., rather than interacting with a common instance shared with a plurality of users) in real-time or near-real-time. However, the interactions of other users in other instances of the virtual environment may not be reflected in views of the virtual environment presented to the given player, at least not in real-time or near-real-time. As such, individual users may be somewhat isolated within the virtual environment from the other users. Although the virtual environment may be the same, real-time interaction between the users within the virtual environment may not be possible.

In some implementations, the asynchronous virtual environment may include an asynchronous virtual space in which the users separately and individually participate in a videogame. In order to participate in the videogame a user controls one or more objects (e.g., an avatar) within the virtual space to achieve game objectives. In the virtual space, the performance of the same or corresponding activities in the virtual space by others are not represented to the user. Instead, each user may appear to be "alone" in the virtual space, interacting with the topography, buildings, non-player characters, and/or other objects that are not controlled or influenced by other players.

The activity definition module may be configured to obtain activity criteria that define a group activity for a user group. The group activity may include a task (defined by the activity criteria) to be performed separately by users in the user group separately within their own instances of the asynchronous virtual environment. By way of non-limiting example, the task may include defeating a boss character, travelling to a checkpoint, learning a skill, opening a door or gate, pushing an obstacle, and/or other tasks. The activity criteria may include one or more of group parameters, task parameters, timing parameters, group participation parameters, consequence parameters, and/or other parameters.

The group parameters of a group activity may define the user group to be included in the group activity. As such, the group parameters may include identities, usernames, avatar names, and/or other identifiers of the user group to be included in the group activity. The group parameters may include group parameters that are predefined and/or predetermined. For example, a set of users may have previously formed a user group, and the group parameters may have been previously defined for this user group. A given user may belong to more than one such user group. As such, if the given user is going to initiate a group activity, the activity definition module may be configured to receive a user selection from the given user of the user group for the group activity.

The activity definition module may be configured such that a given user initiating an activity may select individual users to be included in a user group for the group activity. In such implementations, the activity definition module may obtain the group parameters by receiving the user selections.

The group parameters may be obtained by the activity definition module by defining a user group of users that are currently participating in the asynchronous virtual environment, and/or are at the same or a similar location within the asynchronous virtual environment. The activity definition module may obtain the group parameters by determining the group parameters for the defined user group.

The task parameters of the group activity may define the task to be performed separately by the individual users in the user group. The task parameters may be obtained by the activity definition module from a predetermined set of tasks with previously defined task parameters. The task parameters may be obtained by the activity definition module by receiving user selection of one or more task parameters from a user initiating the group activity. For example, a user interface configured to receive user selection of one or more task parameters may be presented to users via client computing platforms.

The timing parameters may dictate the timing with which the individual users in a user group attempting a group activity must separately perform the task. The timing parameters may specify a time window (e.g., an amount of time from initiation of the group activity) within which the task must be finished for performance to count toward accomplishment of the group activity. The timing parameter may specify a time window within which the task must be started for performance to count toward accomplishment of the group activity. The timing parameters may vary from group activity to group activity. The timing parameters may be specified in advance for a group activity.

The group participation parameters may dictate a threshold amount of users that must accomplish the task for successful performance of the group activity. Accomplishment of the task may require that the task be performed in accordance with the timing parameters for the group activity. The threshold amount of users dictated by the group participation parameters may include a fixed number of users, or an amount that varies based on one or more of how many users are in the user group, how many users in the user group are currently participating in the asynchronous virtual environment, how many users in the user group are in a position within the asynchronous virtual environment to attempt the task, and/or other considerations. Group participation parameters may be uniform across the asynchronous virtual environment. Group participation parameters may be specific to a group activity (e.g., predefined on a per-activity basis).

The consequence parameters may dictate the consequences of a successful attempt of a group activity. The consequence parameters may define a reward that may be provided to at least one of the users in the user group (e.g., the user that initiated the group activity, all of the users, and/or a subset of the users in the user group) as a consequence of successfully completing the group activity. The reward may include one or more of points, manna, virtual currency, access to content, acquired or enhanced skill or abilities, virtual goods, and/or other rewards. The consequence parameters may define a penalty that may be provided to at least one of the users in the user group as a consequence of unsuccessfully attempting the group activity. The penalty may include a decrease, reduction, or restriction of one or more of points, manna, virtual currency, access to content, acquired or enhanced skill or abilities, virtual goods, and/or other penalties. The consequence parameters for a group activity may be predetermined.

The activity initiation module may be configured to initiate a group activity. Once a group activity is initiated, the user group may be committed to the group activity. Initiation of a group activity may be triggered automatically. For example, progress through a game within the asynchronous virtual environment may bring the users to a certain point, hereafter referred to as a trigger point, at which a group activity may be used to advance (e.g., access additional content). Progression of a given user within the asynchronous virtual environment to the trigger point may cause the activity initiation module to initiate a group activity corresponding to the trigger point. Arrival at a trigger point may include being positioned at a virtual location within the asynchronous virtual environment, interacting with the asynchronous virtual environment in a predetermined manner, and/or other actions within the asynchronous virtual environment. A group activity may be triggered automatically at predetermined intervals (e.g., every day, at specific times of day, weekly, monthly, and/or other intervals).

The activity initiation module may be configured to initiate a group activity responsive to reception of a user selection indicating that the group activity should be initiated. The user selection may be received through a user interface provided to the user via a client computing platform. The user interface may be presented to a user responsive to the user reaching a trigger point in the asynchronous virtual environment. The user interface may be presented to a user responsive to a request from the user for a group activity.

At the initiation of a group activity by the activity initiation module, the activity initiation module may transmit an initiation message to users in the user group. The initiation message may indicate to the users in the user group that the group activity is beginning. The initiation message may convey some of the activity criteria to the users in the user group. The activity criteria conveyed in the initiation message may include one or more of group parameters (or other information identifying the user group), task parameters (or other information identifying the task), timing parameters, group participation parameters, consequence parameters, and/or other activity criteria. Transmission of the initiation message to the users may enable the individual users in the user group to accept or reject the group activity. The activity initiation module may be configured to receive the acceptances and/or rejections of the group activity by the users.

The group performance monitoring module may be configured to monitor the separate performances of (or attempts to perform) the task by the individual users in the user group. This may included receiving information related to performance of the task by the users from the environment module. Such information may include information generated by the client computing platforms and provided to the group performance monitoring module via the environment module, and/or information generated by the environment module during the group activity.

The activity evaluation module may be configured to evaluate performance of the group activity by the user group. Such evaluation may be based on the separate performances of the task by the individual users within the asynchronous virtual environment and the activity criteria. For example, the activity evaluation module may compare the separate performances of the task by the individual users to determine which (and/or how many) users performed the task according to timing parameters associated with the group activity. The activity evaluation module may then compare the number of users that performed the task according to the timing parameters to a threshold amount of users dictated by the group participation parameters. If the number of users that successfully performed the task according to the timing parameters reaches the threshold amount, the activity evaluation module may determine that performance of the group activity has been successful. If the number of users that successfully performed the task does not reach the threshold amount, then the activity evaluation module may determine that the attempt of the group activity has been unsuccessful. A successful performance of the group activity may require the user that initiated the group activity to successfully complete the task, if this is required in the activity criteria.

The activity consequence module may be configured to provide a consequence to the users in the user group based on the evaluation of performance by the activity evaluation module. The consequence may be provided in accordance with the consequence parameters included in the activity criteria. Responsive to the activity evaluation module determining that the group activity has been performed successfully, the activity consequence module may provide a reward to at least one user in the user group. The rewards provided to the users may include one or more of points, manna, virtual currency, access to content, acquired or enhanced skill or abilities, virtual goods, and/or other rewards. Responsive to the activity evaluation module determining that an attempt of the group activity has been unsuccessful, the activity consequence module may assess a penalty to at least one user in the user group. The penalties assessed to the users may include a decrease, reduction, or restriction of one or more of points, manna, virtual currency, access to content, acquired or enhanced skill or abilities, virtual goods, and/or other penalties.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
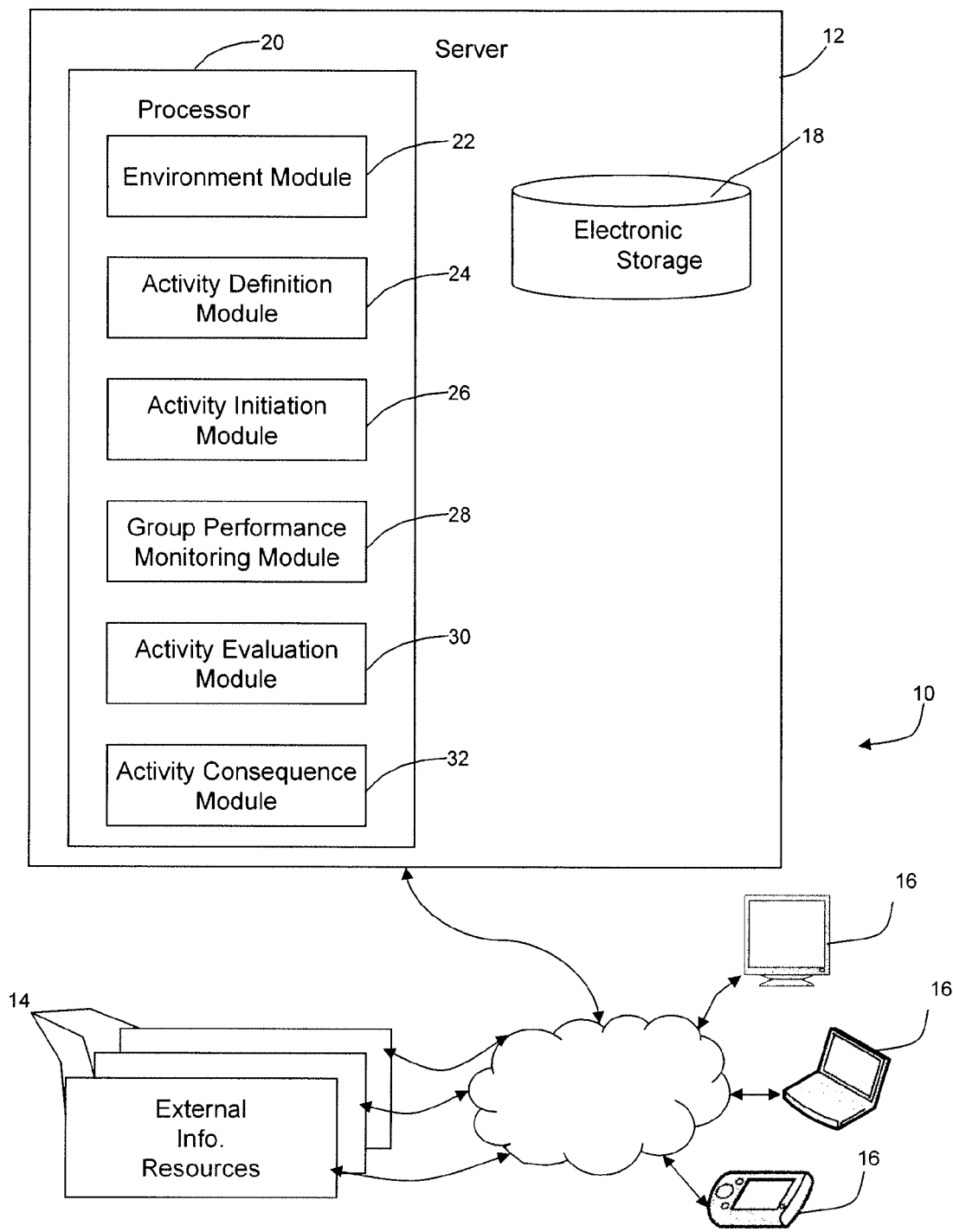
FIG. 1 illustrates a system configured to provide an asynchronous virtual environment to users, in accordance with one or more embodiments of the invention.

FIG. 1 illustrates a system 10 configured to provide an asynchronous virtual environment to a plurality of users. The system 10 may be configured to enable and/or encourage cooperative and even coordinated activity between users, despite the asynchronous nature of the virtual environment. This may enable system 10 to support coordinated group-based activities within an environment that is asynchronous between the users. Since asynchronous virtual environments tend to be less costly to provide to users (e.g., in processing capabilities, serving capabilities, bandwidth requirements, and/or other costs), system 10 may reduce the cost associated with a virtual environment in which users participate in cooperative activities.

In some implementations, system 10 may include one or more virtual environment servers 12, and/or other components. The system 10 may operate in communication and/or coordination with one or more external resources 14. Users may interface with system 10 and/or external resources 14 via client computing platforms 16. The components of system 10, virtual environment servers 12, external resources 14, and/or client computing platforms 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which virtual environment servers 12, external resources 14, and/or client computing platforms 16 may be operatively linked via some other communication media.

A given client computing platform 16 may include one or more processors configured to execute computer program modules. The computer program modules may be configured to enable one or more users associated with the given client computing platform 16 to interface with system 10 and/or external resources 14, and/or provide other functionality attributed herein to client computing platforms 16. By way of non-limiting example, the given client computing platform 16 may include one or more of a desktop computer, a laptop computer, a handheld computer, a NetBook, a Smartphone, a gaming console, and/or other computing platforms.

The external resources 14 may include sources of information, hosts and/or providers of virtual environments outside of system 10, external entities participating with system 10, and/or other resources. In some implementations, some or all of the functionality attributed herein to external resources 14 may be provided by resources included in system 10.

The virtual environment servers 12 may be configured to provide the asynchronous environment to the users via client computing platforms 16. This may include serving the asynchronous environment to the users. The virtual environment servers 12 may include electronic storage 18, one or more processors 20, and/or other components. The virtual environment servers 12 may include communication lines, or ports to enable the exchange of information with a network and/or other computing platforms.

Electronic storage 18 may comprise electronic storage media that electronically stores information. The electronic storage media of electronic storage 18 may include one or both of system storage that is provided integrally (i.e., substantially non-removable) with virtual environment servers 12 and/or removable storage that is removably connectable to virtual environment servers 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 20, information received from virtual environment servers 12, information received from client computing platforms 16, and/or other information that enables virtual environment servers 12 to function properly.

Processor(s) 20 is configured to provide information processing capabilities in system servers 14. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination.

As is shown in FIG. 1, processor 20 may be configured to execute one or more computer program modules. The one or more computer program modules may include one or more of an environment module 22, an activity definition module 24, activity initiation module 26, a group performance monitoring module 28, an activity evaluation module 30, an activity consequence module 32, and/or other modules. Processor 20 may be configured to execute modules 22, 24, 26, 28, 30, and/or 32 by software; hardware; firmware; some combination of software, hardware, and/or firmware; and/or other mechanisms for configuring processing capabilities on processor 20.

It should be appreciated that although modules 22, 24, 26, 28, 30, and 32 are illustrated in FIG. 1 as being co-located within a single processing unit, in implementations in which processor 20 includes multiple processing units, one or more of modules 22, 24, 26, 28, 30, and/or 32 may be located remotely from the other modules. The description of the functionality provided by the different modules 22, 24, 26, 28, 30, and/or 32 described below is for illustrative purposes, and is not intended to be limiting, as any of modules 22, 24, 26, 28, 30, and/or 32 may provide more or less functionality than is described. For example, one or more of modules 22, 24, 26, 28, 30, and/or 32 may be eliminated, and some or all of its functionality may be provided by other ones of modules 22, 24, 26, 28, 30, and/or 32. As another example, processor 20 may be configured to execute one or more additional modules that may perform some or all of the functionality attributed below to one of modules 22, 24, 26, 28, 30, and/or 32.

The environment module 22 may be configured to provide the asynchronous virtual environment to users via client computing platforms 16. As used herein, a "virtual environment" may include a virtual space, one or more interactive electronic media, and/or other virtual environments.

A virtual space may comprise a simulated space (e.g., a physical space) that is accessible by a client (e.g., client computing platforms 16) that presents a view of the virtual space to a user. The simulated space may have a topography, express ongoing real-time interaction by the user, and/or include one or more objects positioned within the topography that are capable of locomotion within the topography. In some instances, the topography may be a 2-dimensional topography. In other instances, the topography may be a 3-dimensional topography. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.).

Within a virtual space provided by virtual environment servers 12, avatars associated with the users may be controlled by the users to interact with the virtual space. As used herein, the term "avatar" may refer to an object (or group of objects) present in the virtual space that represents an individual user. The avatar may be controlled by the user with which it is associated. The avatars may move through and interact with the virtual space (e.g., non-player characters in the virtual space, other objects in the virtual space). The avatar associated with a given user may be created and/or customized by the given user. The avatar may be associated with an "inventory" of virtual goods and/or currency that the user can use (e.g., by manipulation of the avatar and/or the items) within the virtual space.

Interactive electronic media may include one or more of a social network, a virtual space, a micro-blogging service, a blog service (or host), a browser-based game, a mobile game, a file (e.g., image file, video file, and/or other files) sharing service, a messaging service, a message board, a forum, and/or other electronically distributed media that are scalable and enable interaction between users and the virtual environment.

As used herein, the term "asynchronous virtual environment" may refer to a virtual environment that is provided to the users individually such that each user is able to interact with the virtual environment (and view their own interactions) in real-time or near-real-time. However, the interactions of other users with the virtual environment may not be reflected in views of the virtual environment, at least not in real-time or near-real-time. As such, each user may be somewhat isolated within the virtual environment from the other users. Although the virtual environment may be the same, real-time interaction between the users within the virtual environment may not be possible.

It will be appreciated that the description of an "asynchronous virtual environment" above does not preclude some minimal level of awareness between the users of the activities of other users. For example, a user may be presented with the current "status" of other users in the virtual environment (e.g., present, absent, fighting, leveling, and/or other status information). The system 10 may facilitate communication between users. However, such communication may be ancillary to and/or separate from the virtual environment. For instance, system 10 may support chat and/or messaging features. This communication does not directly convey to the users the interactions of the other users with the virtual environment. As another example, a user may receive updates or notifications about the general progress or activities of other users within the virtual environment. But the interactions of the other users that resulted in the updates or notifications are not provided to the user within the virtual environment in a real-time, ongoing manner.

In some implementations, the asynchronous virtual environment may include an asynchronous virtual space in which the users separately and individually participate in a videogame. In order to participate in the videogame a user controls one or more objects (e.g., an avatar) within the virtual space to achieve game objectives. In the virtual space, the performance of the same or corresponding activities in the virtual space by others are not represented to the user. Instead, each user may appear to be "alone" in the virtual space, interacting with the topography, buildings, non-player characters, and/or other objects that are not controlled or influenced by other players.

The provision of the asynchronous virtual environment to the users by environment module 22 may be accomplished in cooperation with a client application that is executed on client computing platforms 16. The client application may be a "fat" client, a "thin" client, and/or other types of client applications.

The client executed on client computing platforms 16 may provide a relatively large amount of the processing cost associated with presenting the asynchronous virtual environment to the user. For example, the client may create an instance of the asynchronous virtual environment locally on the client computing platforms 16. The client executing on one of client computing platforms 16 may display views of the virtual environment that are obtained form the local instance of the asynchronous virtual environment. The client may provide information to environment module 22 related to the interactions of the user with the instance of the asynchronous virtual environment executed on the client computing platform 16. The client may receive instructions or commands from environment module 22 regarding interactions of the virtual environment directed toward the user.

The client executed on client computing platforms 16 may provide a relatively small amount of the processing associated with presenting the asynchronous virtual environment to the user. For example, the environment module 22 may create instances of the asynchronous virtual environment on virtual environment servers 12 for the individual users. View information describing views of the instances may then be transmitted by environment module 22 from virtual environment servers 12 to client computing platforms 16, where the corresponding views may be assembled from the view information and presented to the users by the client.

The activity definition module 24 may be configured to obtain activity criteria that define a group activity for a user group. The group activity may include a task (defined by the activity criteria) to be performed separately by users in the user group separately within their own instances of the asynchronous virtual environment. By way of non-limiting example, the task may include defeating a boss character, travelling to a checkpoint, learning a skill, opening a door or gate, pushing an obstacle, and/or other tasks. The activity criteria may include one or more of group parameters, task parameters, timing parameters, group participation parameters, consequence parameters, and/or other parameters.

The group parameters of a group activity may define the user group to be included in the group activity. As such, the group parameters may include identities, usernames, avatar names, and/or other identifiers of the user group to be included in the group activity. The group parameters may include group parameters that are predefined and/or predetermined. For example, a set of users may have previously formed a user group, and the group parameters may have been previously defined for this user group. A given user may belong to more than one such user group. As such, if the given user is going to initiate a group activity, the activity definition module 24 may be configured to receive a user selection from the given user of the user group for the group activity.

Figure 2:
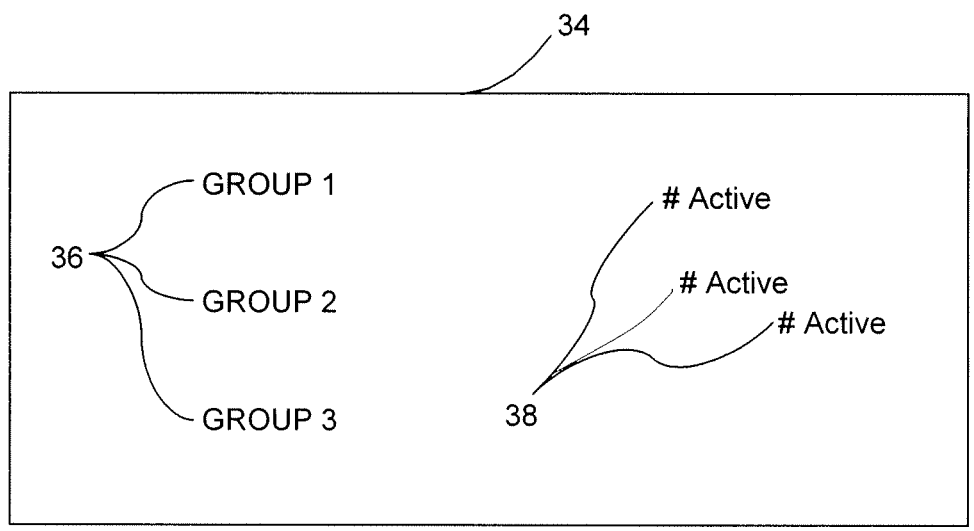
FIG. 2 illustrates a user interface configured to receive user selection or entry of a user group, according to one or more embodiments of the invention.

By way of illustration, FIG. 2 shows an exemplary user interface 34 configured to receive user selection of a user group for a group activity. The user interface 34 may be presented to a user through a client computing platform being used by the user to access the asynchronous virtual environment. The user interface 34 may include selectable predefined user groups 36 to which the user presented with user interface 34 belongs. The user interface 34 may include an indicator 38 for the user groups 36 indicating an amount of users in the individual user groups 36 that are currently participating in the asynchronous virtual environment. The indicator 38 may include, for a example, a number of active users, a percentage of active users, or other indicators of status or current participation in the asynchronous virtual environment. Responsive to reception of selection of a user group through user interface 34, the group parameters for the selected user group may be obtained.

Figure 3:
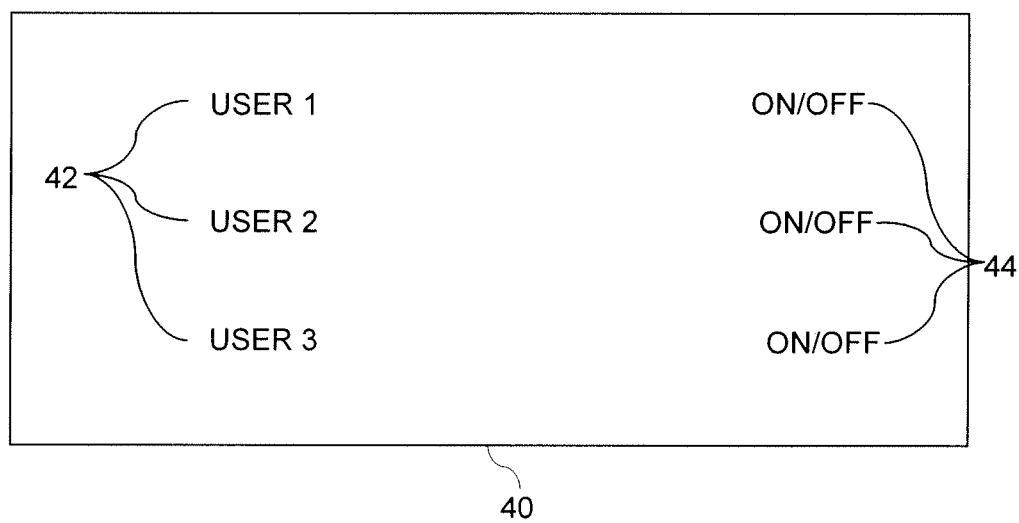
FIG. 3 illustrates a user interface configured to receive user selection or entry of users for a user group, in accordance with one or more embodiments of the invention.

Referring back to FIG. 1, activity definition module 24 may be configured such that a given user initiating an activity may select individual users to be included in a user group for the group activity. In such implementations, activity definition module 24 may obtain the group parameters by receiving the user selections. By way of illustration, FIG. 3 depicts an exemplary user interface 40 configured to receive user selections of individual users for inclusion in a user group. The user interface 40 may be presented to the user by a client computing platform being used by the user to access the asynchronous virtual environment. The user interface 40 may include fields 42 that receive selection and/or entry of individual users for inclusion in the user group. A status identifier 44 may be provided for the individual users that indicates whether the individual users are currently participating in the asynchronous virtual environment.

Turning again to FIG. 1, the group parameters may be obtained by activity definition module 24 by defining a user group of users that are currently participating in the asynchronous virtual environment, and/or are at the same or a similar location within the asynchronous virtual environment. The activity definition module 24 may obtain the group parameters by determining the group parameters for the defined user group.

The task parameters of the group activity may define the task to be performed separately by the individual users in the user group. The task parameters may be obtained by activity definition module 24 from a predetermined set of tasks with previously defined task parameters. The task parameters may be obtained by activity definition module 24 by receiving user selection of one or more task parameters from a user initiating the group activity. For example, a user interface configured to receive user selection of one or more task parameters may be presented to users via client computing platforms 16.

The timing parameters may dictate the timing with which the individual users in a user group attempting a group activity must separately perform the task. The timing parameters may specify a time window (e.g., an amount of time from initiation of the group activity) within which the task must be finished for performance to count toward accomplishment of the group activity. The timing parameter may specify a time window within which the task must be started for performance to count toward accomplishment of the group activity. The timing parameters may vary from group activity to group activity. The timing parameters may be specified in advance for a group activity.

The group participation parameters may dictate a threshold amount of users that must accomplish the task. Accomplishment of the task may require that the task be performed in accordance with the timing parameters for the group activity. The threshold amount of users dictated by the group participation parameters may include a fixed number of users, or an amount that varies based on one or more of how many users are in the user group, how many users in the user group are currently participating in the asynchronous virtual environment, how many users in the user group are in a position within the asynchronous virtual environment to attempt the task, and/or other considerations. Group participation parameters may be uniform across the asynchronous virtual environment. Group participation parameters may be specific to a group activity (e.g., predefined on a per-activity basis).

The consequence parameters may dictate the consequences of a successful attempt of a group activity. The consequence parameters may define a reward that may be provided to at least one of the users in the user group (e.g., the user that initiated the group activity, all of the users, and/or a subset of the users in the user group) as a consequence of successfully completing the group activity. The reward may include one or more of points, manna, virtual currency, access to content, acquired or enhanced skill or abilities, virtual goods, and/or other rewards. The consequence parameters may define a penalty that may be provided to at least one of the users in the user group as a consequence of unsuccessfully attempting the group activity. The consequence parameters for a group activity may be predetermined.

The activity initiation module 26 is configured to initiate a group activity. Once a group activity is initiated, the user group may be committed to the group activity. Initiation of a group activity may be triggered automatically. For example, progress through a game within the asynchronous virtual environment may bring the users to a certain point, hereafter referred to as a trigger point, at which a group activity may be used to advance (e.g., access additional content). Progression of a given user within the asynchronous virtual environment to the trigger point may cause activity initiation module 26 to initiate a group activity corresponding to the trigger point. Arrival at a trigger point may include being positioned at a virtual location within the asynchronous virtual environment, interacting with the asynchronous virtual environment in a predetermined manner, and/or other actions within the asynchronous virtual environment. A group activity may be triggered automatically at predetermined intervals (e.g., every day, at specific times of day, weekly, monthly, and/or other intervals).

The activity initiation module 26 may be configured to initiate a group activity responsive to reception of a user selection indicating that the group activity should be initiated. The user selection may be received through a user interface provided to the user via client computing platform 16. The user interface may be presented to a user responsive to the user reaching a trigger point in the asynchronous virtual environment. The user interface may be presented to a user responsive to a request from the user for a group activity.

At the initiation of a group activity by activity initiation module 26, activity initiation module 26 may transmit an initiation message to users in the user group. The initiation message may indicate to the users in the user group that the group activity is beginning. The initiation message may convey some of the activity criteria to the users in the user group. The activity criteria conveyed in the initiation message may include one or more of group parameters (or other information identifying the user group), task parameters (or other information identifying the task), timing parameters, group participation parameters, consequence parameters, and/or other activity criteria. Transmission of the initiation message to the users may enable the individual users in the user group to accept or reject the group activity. The activity initiation module 26 may be configured to receive the acceptances and/or rejections of the group activity by the users.

Figure 4:
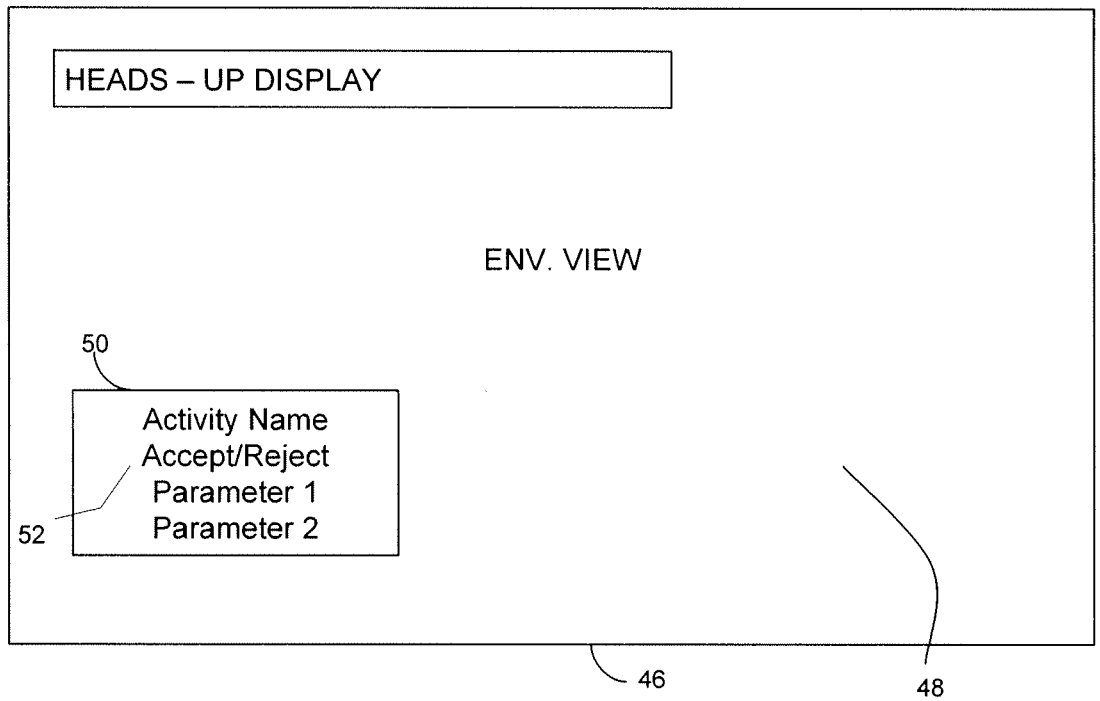
FIG. 4 illustrates a user interface configured to receive user acceptance of a user activity, according to one or more embodiments of the invention.

FIG. 4 illustrates a user interface 46 configured to receive acceptance of a group activity by a user. The user interface 46 may be presented to a user via a client computing platform on which the user may access an asynchronous virtual environment. As can be seen in FIG. 4, user interface 46 may include a view 48 of the asynchronous virtual environment, an activity interface 50, and/or other components. The activity interface 50 may include an acceptance field 52 configured to receive selection or entry of acceptance of a group activity corresponding to the activity interface 50. The activity interface 50 may present information about the group activity to the user. For example, such information may include a title of the group activity and/or activity criteria defining the group activity. The activity interface 50 may be presented to a user initiating the group activity (e.g., by user selection and/or through progress to a trigger point). The activity interface 50 may be presented to a user as an initiation message requesting the user's participation in a group activity initiated by another user.

Referring back to FIG. 1, group performance monitoring module 28 may be configured to monitor the separate performances of (or attempts to perform) the task by the individual users in the user group. This may included receiving information related to performance of the task by the users from environment module 22. Such information may include information generated by client computing platforms 16 and provided to group performance monitoring module 28 via environment module 22, and/or information generated by environment module 22 during the group activity.

The activity evaluation module 30 may be configured to evaluate performance of the group activity by the user group. Such evaluation may be based on the separate performances of the task by the individual users within the asynchronous virtual environment and the activity criteria. For example, activity evaluation module 30 may compare the separate performances of the task by the individual users to determine which (and/or how many) users performed the task according to timing parameters associated with the group activity. The activity evaluation module 30 may then compare the number of users that performed the task according to the timing parameters to a threshold amount of users dictated by the group participation parameters. If the number of users that successfully performed the task according to the timing parameters reaches the threshold amount, activity evaluation module 30 may determine that performance of the group activity has been successful. If the number of users that successfully performed the task does not reach the threshold amount, then activity evaluation module 30 may determine that the attempt of the group activity has been unsuccessful. A successful performance of the group activity may require the user that initiated the group activity to successfully complete the task, if this is required in the activity criteria.

The activity consequence module 32 may be configured to provide a consequence to the users in the user group based on the evaluation of performance by activity evaluation module 30. The consequence may be provided in accordance with the consequence parameters included in the activity criteria. Responsive to activity evaluation module 30 determining that the group activity has been performed successfully, activity consequence module 32 may provide a reward to at least one user in the user group. The rewards provided to the users may include one or more of points, manna, virtual currency, access to content, acquired or enhanced skill or abilities, virtual goods, and/or other rewards. Responsive to activity evaluation module 30 determining that an attempt of the group activity has been unsuccessful, activity consequence module 32 may assess a penalty to at least one user in the user group. The penalties assessed to the users may include a decrease, reduction, or restriction of one or more of points, manna, virtual currency, access to content, acquired or enhanced skill or abilities, virtual goods, and/or other rewards.

The activity consequence module 32 may be configured to provide the same consequence to all of the users in the user group that receive a consequence. The activity consequence module 32 may be configured to provide different consequences to the users in the user group. For example, responsive to activity evaluation module 30 determining that the group activity has been successfully performed, activity consequence module 32 may be configured to provide a primary reward to the user that initiated the group activity and a secondary reward to other ones of the users in the user group. Responsive to an unsuccessful attempt of the group activity, activity consequence module 32 may be configured to assess a primary penalty to the user that initiated the group activity and a secondary penalty to other ones of the users in the user group.

In some implementations, a group activity may include at least some activity criteria that are predetermined within the virtual environment. Users may participate in this group activity more than once. The activity consequence module 32 may be configured to provide, responsive to activity evaluation module 30 determining that this group activity has been successfully performed, a first reward to users in the user group that have not previously successfully performed the group activity and a second reward to users in the user group that have previously performed the group activity.

During a group activity, not all of the users in the user group may attempt the task. For some of the users may not be present in the asynchronous virtual environment, may not be in a position within the asynchronous virtual environment to attempt the task, may not have an interest in the group activity, and/or may not attempt the task for other reasons. The activity consequence module 32 may be configured to provide, responsive to activity evaluation module 30 determining that the group activity has been successfully performed, a first reward to users in the user group that have attempted the task. A second reward may be provided to users in the user group that have not attempted the task. The first reward or the second reward may be no reward. The activity consequence module 32 may be configured such that responsive to an unsuccessful attempt of the first activity, a first penalty may be assessed to users that attempted the task, while a second penalty may be assessed to users that did not attempt the task. The first penalty or the second penalty may be no penalty.

During a group activity, not all of the users in the user group may successfully perform the task. The activity consequence module 32 may be configured to provide, responsive to activity evaluation module 30 determining that the group activity has been successfully performed, a first reward to users in the user group that have successfully performed the task and a second reward to users in the user group that have not successfully performed the task. The first reward or the second reward may be no reward. The activity consequence module 32 may be configured such that responsive to an unsuccessful attempt of the first activity, a first penalty may be assessed to users that successfully performed the task, while a second penalty may be assessed to users that did not successfully perform the task. The first penalty or the second penalty may be no penalty.

In some implementations, activity consequence module 32 may be configured such that the rewards and/or penalties provided to the users based on group activity performance may scale with the number of users that successfully performed the task. The more users in the user group that successfully perform the task, the greater the rewards provided to the users for a successful performance of the group activity may be. The more users in the user group that successfully perform the task in a failed attempt of a group activity, the smaller the penalties assessed to the users in the user group may be.

Figure 5:
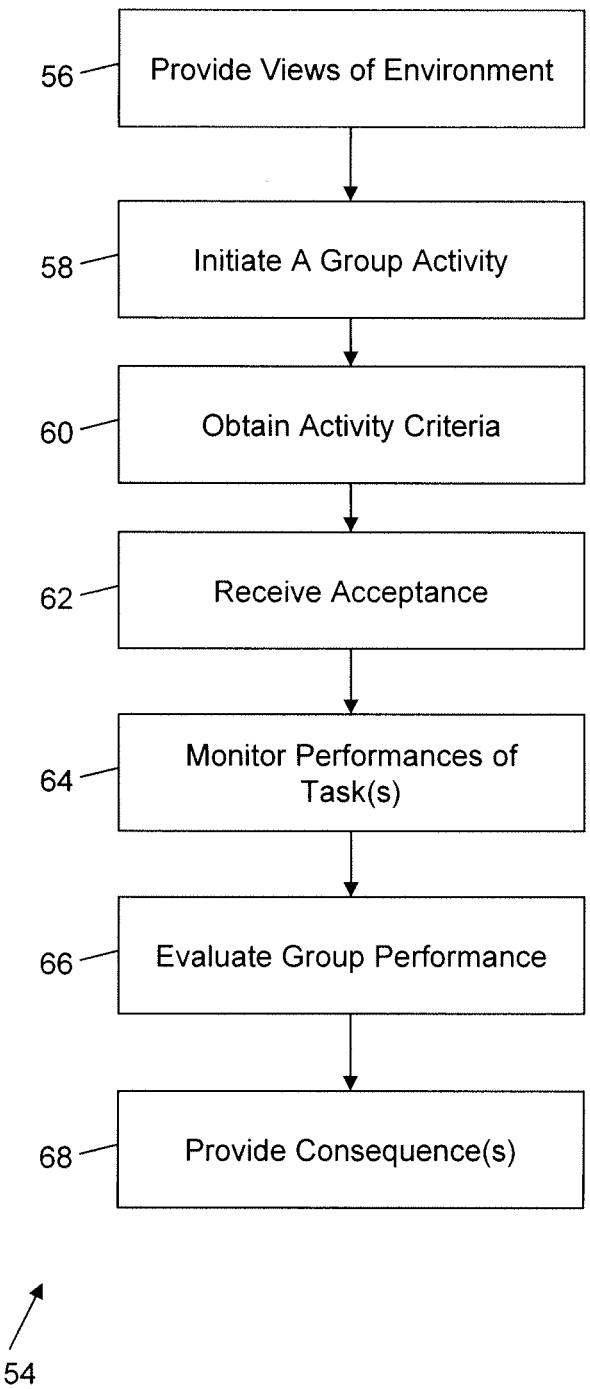
FIG. 5 illustrates a method of providing an asynchronous virtual environment to users, according to one or more embodiments of the invention.

FIG. 5 illustrates a method 54 of providing an asynchronous virtual environment to users, in which cooperation between the users is enabled and/or encouraged. The operations of method 54 presented below are intended to be illustrative. In some embodiments, method 54 may be accomplished with one or more additional operations not described, and/or without one or more of the operations discussed. Additionally, the order in which the operations of method 54 are illustrated in FIG. 5 and described below is not intended to be limiting.

In some embodiments, method 54 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 54 in response to instructions stored electronically on an electronic storage medium. The one or more processing devices may include one or more devices configured through hardware, firmware, and/or software to be specifically designed for execution of one or more of the operations of method 54.

At an operation 56, views of the asynchronous virtual environment may be provided to the users. The views of the asynchronous virtual environment may include views of separate instances of the asynchronous virtual environment for the individual users. In some implementations, operation 56 may be performed by an environment module similar to or the same as environment module 22 (shown in FIG. 1 and described above).

At an operation 58, a determination may be made to initiate a group activity within the asynchronous virtual environment. The determination may be made based on user selection and/or based on a user arriving at a trigger point in the asynchronous virtual environment. Arrival at a trigger point may include being positioned at a virtual location within the asynchronous virtual environment, interacting with the asynchronous virtual environment in a predetermined manner, and/or other actions within the asynchronous virtual environment. The determination may be made based on a predetermined time interval (e.g., every day, at specific times of day, weekly, monthly, and/or other intervals). In some implementations, operation 58 may be performed by an activity initiation module similar to or the same as activity initiation module 26 (shown in FIG. 1 and described above).

At an operation 60, activity criteria defining the group activity may be obtained. The activity criteria may include one or more of group parameters, task parameters, timing parameters, group participation parameters, consequence parameters, and/or other criteria. Obtaining the activity criteria may include one or more of receiving user selection and/or entry of activity criteria, accessing previously stored activity criteria, determining activity criteria, and/or other forms of obtaining criteria. In some implementations, operation 60 may be performed by an activity definition module similar to or the same as activity definition module 24 (shown in FIG. 1 and described above).

At an operation 62, acceptance of the group activity may be received from one or more of the users in the user group. The users may include the user that initiated the group activity and/or other users in the user group. In some implementations, operation 62 may be performed by an activity initiation module similar to or the same as activity initiation module 26 (shown in FIG. 1 and described above).

At an operation 64, separate performances of a task within the asynchronous virtual environment by the users in the user group may be monitored. The task may be a task associated with the group activity. The task may be defined by the activity criteria. The users in the user group may perform the task separate from other users within their own view(s) of the asynchronous virtual environment. In some implementations, operation 64 may be performed by a group performance monitoring module similar to or the same as group performance monitoring module 28 (shown in FIG. 1 and described above).

At an operation 66, performance of the group activity by the user group may be evaluated. Evaluation of the performance of the group activity may be based on the separate performances (and/or attempts to perform) the task by the individual users in the user group and the activity criteria. In some implementations, operation 66 may be performed by an activity evaluation module similar to or the same as activity evaluation module 30 (shown in FIG. 1 and described above).

At an operation 68, consequences of the group activity may be provided to at least one of the users in the user group. Responsive to the user group successfully performing the group activity, at least one user in the user group may be provided with a reward. Responsive to the user group unsuccessfully performing the group activity, at least one user in the user group may be assessed a penalty. In some implementations, operation 68 may be performed by an activity consequence module similar to or the same as activity consequence module 32 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A virtual environment server configured to provide an asynchronous online game, the virtual environment server comprising:
one or more physical computer processors configured by machine readable instructions that cause the one or more physical computer processors to:
facilitate creation of a plurality of instances of an asynchronous online game on client computing platforms associated with individual users in a user group, wherein each client computing platform is associated with a respective user, wherein facilitating creation of the plurality of instances of the asynchronous online game on the client computing platforms comprises:
shifting a processing load associated with each instance of the online game to a respective user's client computing platform based on execution of the online game by each respective client computing platform, wherein each user's interactions with the online game is synchronously processed by their respective client computing platform; and
asynchronously receiving view information describing views of the plurality of instances from each respective client computing platform by the virtual environment server to coordinate asynchronous play between individual users in the user group, wherein views of a first instance of the asynchronous online game are assembled by a first client from the view information;
coordinate a group activity between individual users in the user group without using synchronous communication to and from the virtual environment server based on assigning tasks to each separate client computing platform's game instance;
obtain activity criteria that define a group game activity for the user group,
wherein:
the activity criteria are obtained via the client computing platform configured to receive selection of the activity criteria from a given user; and
the activity criteria includes a timing parameter specifying a predetermined time interval within which the game task by the individual users on their respective client computing platform must be finished for the individual performances to count toward accomplishment of the group game activity;
update the user group's progress towards achieving the task based on periodically updating the virtual environment server with game progress from each separate client computing platform;
evaluate performance of the group game activity by the user group, wherein evaluation of the performance of the group game activity includes separate evaluations of the separate performances and comparison of the separate performances with the activity criteria;
determine a consequence for the users in the user group based on the evaluation of performance of the group game activity by the user group and based on one or more consequence parameters defining potential consequences for the users; and
implement the consequence for the users in the asynchronous online game
wherein:
the one or more physical computer processors are further configured to obtain performance reports corresponding to the individual users in the user group, wherein the performance reports indicate whether the corresponding individual users have completed the game task, and wherein the one or more physical computer processors are further configured to evaluate performance of the group game activity by the user group based on the performance reports.

2. The virtual environment server of claim 1, wherein the one or more physical computer processors are further configured such that, responsive to the user group successfully completing the group game activity, a reward is provided to at least one of the users in the user group as a consequence.

3. The virtual environment server of claim 1, wherein the one or more physical computer processors are further configured such that, responsive to the user group being unsuccessful in completing the group game activity, a penalty is assessed to at least one of the users in the user group as a consequence.

4. The virtual environment server of claim 1, wherein the one or more physical computer processors are further configured such that the activity criteria comprise one or more of group parameters that define the user group, game task parameters that define the game task, group participation parameters.

5. The virtual environment server of claim 1, wherein the one or more physical computer processors are further configured such that the activity criteria is obtained from a predetermined set of criteria.

6. The virtual environment server of claim 1, wherein the asynchronous online game is an asynchronous videogame played individually and separately by the users.

7. The virtual environment of claim 1, wherein the one or more physical computer processors are configured to receive user selection from a user in the user group that commits the user group to performance of the group game activity.

8. A computer-implemented method in an asynchronous online game, the method being implemented in virtual environment server that includes one or more physical computer processors and storage media storing machine-readable instructions, the method comprising:
   facilitating creation of a plurality of instances of an asynchronous online game on client computing platforms associated with individual users in a user group, wherein each client computing platform is associated with a respective user, wherein facilitating creation of the plurality of instances of the asynchronous online game on the client computing platforms comprises:
      shifting a processing load associated with each instance of the online game to a respective user's client computing platform based on execution of the online game by each respective client computing platform, wherein each user's interactions with the online game is synchronously processed by their respective client computing platform; and
      asynchronously receiving view information describing views of the plurality of instances from each respective client computing platform by the virtual environment server to coordinate asynchronous play between individual users in the user group, wherein views of a first instance of the asynchronous online game are assembled by a first client from the view information;
   coordinating a group activity between individual users in the user group without using synchronous communication to and from the virtual environment server based on assigning tasks to each separate client computing platform's game instance;
   obtaining activity criteria that define a group game activity for a the user group,
   wherein:
      the activity criteria are obtained via the client computing platform configured to receive selection of the activity criteria from a given user; and
      the activity criteria includes a timing parameter specifying a predetermined time interval within which the game task by the individual users on their respective client computing platform must be finished for the individual performances to count toward accomplishment of the group game activity;
   updating the user group's progress towards achieving the task based on periodically updating the virtual environment server with game progress from each separate client computing platform;
   evaluating performance of the group game activity by the user group, wherein evaluation of the performance of the group game activity includes separate evaluations of the separate performances and comparison of the separate performances with the activity criteria;
   determining a consequence for the users in the user group based on the evaluation of performance of the group game activity by the user group and based on one or more consequence parameters defining potential consequences for the users; and
   implementing the consequence for the users in the asynchronous online game
   wherein:
      obtaining performance reports corresponding to the individual users in the user group, wherein the performance reports indicate whether the corresponding individual users have completed the game task, and wherein the evaluation of the performance of the group game activity by the user group is based on the performance reports.

9. The method of claim 8, wherein, responsive to the user group successfully completing the group game activity, the consequence comprises a reward provided to at least one of the users in the user group.

10. The method of claim 8, wherein, responsive to the user group being unsuccessful in completing the group game activity, the consequence comprises a penalty is assessed to at least one of the users in the user group.

11. The method of claim 8, wherein the activity criteria comprise one or more of group parameters that define the user group, group task parameters that define the game task, group participation parameters, or consequence parameters defining potential consequences for the group game activity.

12. The method of claim 8, wherein the activity criteria is obtained from a predetermined set of criteria.

13. The method of claim 8, wherein the asynchronous-online game is an asynchronous videogame played individually and separately by the users.

14. The method of claim 8, further comprising receiving a user selection from a user in the user group that commits the user group to performance of the group game activity.

15. A computer-implemented method of providing an asynchronous videogame, the method being implemented in a virtual environment server comprising one or more physical computer processors and storage media storing machine-readable instructions, the method comprising:
   facilitating creation of a plurality of instances of the asynchronous videogame separately on client computing platforms associated with individual users in a user group, wherein each client computing platform is associated with a respective user, wherein facilitating creation of the plurality of instances of the asynchronous videogame comprises:
      shifting a processing load associated with each instance of the videogame to a respective user's client computing platform based on execution of the videogame by each respective client computing platform, wherein each user's interactions with the videogame is synchronously processed by their respective client computing platform;
      asynchronously receiving view information describing views of the plurality of instances from each respective client computing platform by the virtual environment server to coordinate asynchronous play between individual users in the user group, wherein views of a first instance of the asynchronous videogame are assembled by a first client from the view information;
   coordinating a group activity between individual users in the user group without using synchronous communication to and from the virtual environment server based on assigning a common task to each separate client computing platform's game instance,
   wherein:

the common task is defined by activity criteria obtained via a client computing platform of a user configured to receive selection of the activity criteria from the user, and the activity criteria includes a timing parameter specifying a predetermined time interval within which the common task by the individual users on their respective client computing platform must be finished for the individual performances to count toward accomplishment of the common task;

determining whether a number of users in the user group to complete the common task within the time interval reaches a threshold number of users; and responsive to the number of users in the user group to complete the common task within the time interval reaching the threshold number of users, providing a reward in the asynchronous videogame to at least one of the users in the group of users wherein:

obtaining performance reports corresponding to the individual users in the user group, wherein the performance reports indicate whether the corresponding individual users have completed the game task, and wherein the evaluation of the performance of the group game activity by the user group is based on the performance reports.

16. The method of claim 15, further comprising responsive to the number of users in the user group to complete the common task within the specified amount of time interval not reaching the threshold number, assessing a penalty in the asynchronous videogame to at least one of the users in the group of users.

\* \* \* \* \*